Jan. 10, 1928. 1,656,027
M. WEBER
IRRIGATION SPRINKLER
Filed Oct. 16, 1925
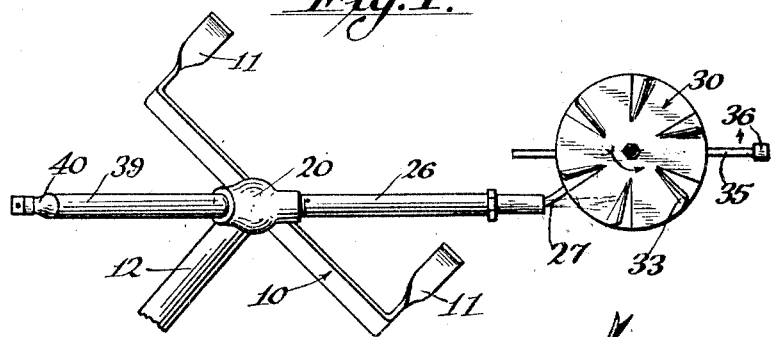
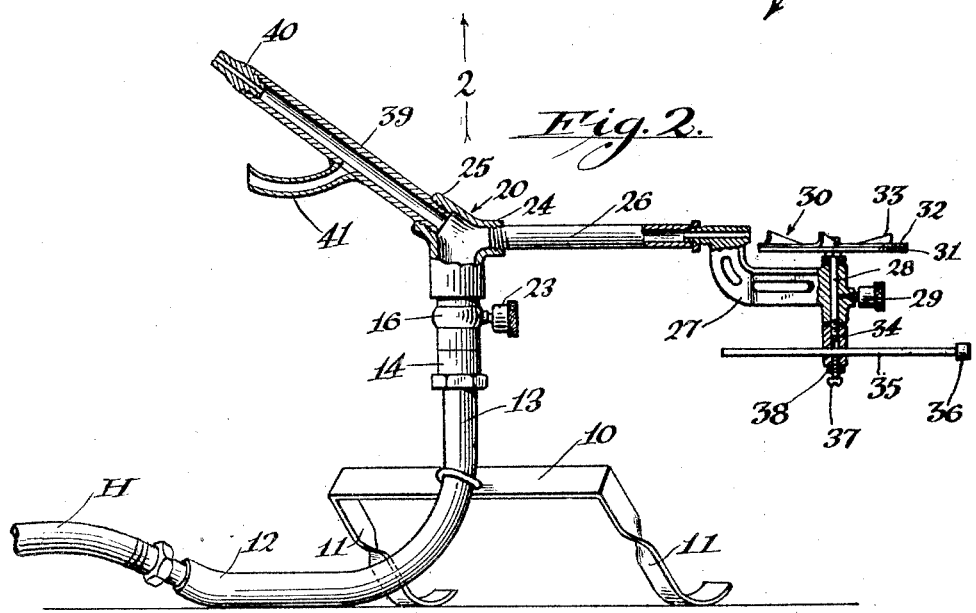
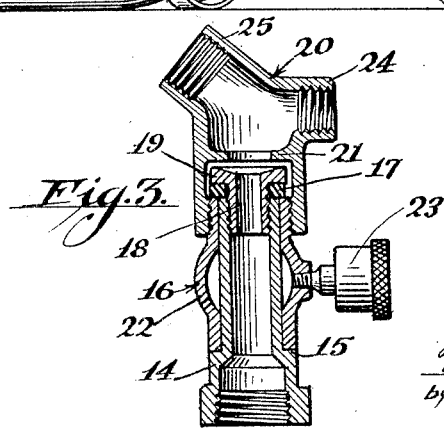
Inventor:
Martin Weber.
by Hazard and Miller
Attorneys.

Patented Jan. 10, 1928.

1,656,027

UNITED STATES PATENT OFFICE.

MARTIN WEBER, OF LOS ANGELES, CALIFORNIA.

IRRIGATION SPRINKLER.

Application filed October 16, 1925. Serial No. 62,863.

This invention relates to improvements in irrigation sprinklers.

An object of the invention is to provide a sprinkler which consists of a standard on which a rotatable distributing head is mounted and which is provided with such a construction operable by the discharge of water so as to produce an extremely slow rotational movement of the distributing head on the standard. In this manner the water discharged has a chance to soak into the ground at any one locality a considerable length of time before an additional supply of water is sprinkled upon it.

With the foregoing and other objects in view which will be made manifest in the following detailed description and specifically pointed out in the appended claims, reference is had to the accompanying drawings for an illustrative embodiment of the invention wherein:

Figure 1 is a top plan view of the improved sprinkler,

Fig. 2 is a side elevation of the sprinkler taken in the direction of the arrow 2 upon Fig. 1, parts being broken away and shown in vertical section, and Fig. 3 is a vertical section through the distributing head and showing the manner in which it is mounted upon the standard.

Referring to the accompanying drawings wherein similar reference characters designate similar parts throughout, the improved sprinkler consists of a standard in the form of a tripod formed of a section of strap iron bent to provide a cross bar 10 and two legs 11. The third leg of the tripod is formed of a section of metallic pipe 12 having an upstanding portion 13 secured to the crossbar 10. On the upper end of the upstanding portion 13 there is threaded a hollow stem 14, the upper portion of which is externally reduced to provide a shoulder 15. A housing or jacket 16 is rotatably positioned about the hollow stem 14 having its lower edge resting upon the shoulder 15. The top edges of the housing or jacket 16 and the hollow stem are substantially flush with each other and have a washer 17 resting thereon. This washer is preferably formed of an antifriction substance such as Babbitt metal. A tubular member 18 is threaded into the hollow stem 14 through the washer 17 and has an outwardly extending flange 19 bearing on the top of the washer so as to maintain the washer against the top of the hollow stem.

A distributing head 20 is threaded onto the jacket 16 so as to be rotatable therewith. This distributing head has an interior annular flange 21 projecting over the flange 19 for a purpose hereinafter to be described. The jacket has its central portion bulged out to provide an annular chamber 22 adapted to receive a water resistant lubricating composition which is supplied by means of a grease cup 23. The distributing head 20 has a horizontally arranged nipple 24 and an upwardly inclined nipple 25. Upon the nipple 24 there is mounted a nozzle 26 which extends radially outwardly and preferably horizontally from the axis of rotation of the distributing head. Adjacent the outer end of the nozzle 26 there is mounted an arm 27 arranged at an angle to the nozzle. On the outer end of the arm there is rotatably mounted a spindle 28, which is rotatable about a vertical axis and which is lubricated by means of a grease cup 29.

On the upper end of the spindle 28 there is provided a fan, generally designated by the reference character 30. This fan is formed of two circular discs of sheet metal secured together side by side and which are indicated at 31 and 32 respectively. The upper disc 32 has radial incisions defining portions 33 which may be bent upwardly out of the plane of the disc 32, thus forming blades adapted to be struck by the stream issuing from the nozzle 26 to produce rotation of the fan. A small sleeve 34 is threaded onto the lower end of the spindle 28, so as to be rotatable with it. In this sleeve there is formed a diametrical aperture adapted to receive the rod 35 carrying a head or weight 36. The rod 35 may be adjusted within the aperture in the sleeve 34 and held in such adjusted position by means of a set screw 37 locked in place by a lock nut 38. The rod 35 with the weight 36 provides a weight which is arranged eccentric to the axis of rotation of the fan 30 and the spindle 28 for a purpose hereinafter to be described.

In the upwardly inclined nipple 25 there is secured a pipe section 39 which is arranged in an upwardly inclined manner, preferably at about 45 deg. In the upper end of this pipe section there is mounted a nozzle 40, and intermediate its top and bottom there is formed a second nozzle 41. This second nozzle is preferably formed of some bendable material, such as soft copper tubing, so that it may be readily bent into positions of various inclinations. The water is supplied to the pipe 12 through a hose H which may be a conventional garden hose.

The operation of the device is as follows: Water entering the pipe 12 from the hose H passes through the hollow stem 14 into the distributing head 20. In the distributing head it divides, part passing into the pipe section 39 and part into the nozzle 26. The part of the water which is discharged through the nozzle 26 strikes the blades 33 and produces rotation of the fan, the spindle 28 and the rod 35. As the rod 35 is employed to provide an eccentric weight upon the fan, it produces various re-actions upon the spindle 28. It will be noted that when the rod 35 is in the position shown in Fig. 1 and also in Fig. 2, the center of gravity of the weight is most remote from the axis of rotation of the distributing head 20, whereas when the rod is in the diametrically opposite position from that shown on the drawing, the center of gravity of the weight is most adjacent the center of rotation of the distributing head 20. Consequently, the re-action upon the spindle in rotating this eccentric weight, when the rod is in the position shown upon the drawing, slightly greater than the re-action upon the spindle. When the rod is in the diametrically opposite position, so that the resultant force upon the spindle is such that it will produce rotation of the distributing head 20 and the structure carried thereby in the direction of the arrow upon Fig. 1. This rotational movement of the distributing head and the structure carried thereby is not steady, but is a slightly jerky motion, although it produces rotation of the distributing head continually in the same direction.

By this construction the distributing head will be caused to rotate very slowly so that the water discharged upon a given locality has a chance to sink in before it is again sprinkled. The stream of water issuing from the nozzle 26 not only rotates the fan 30, but is broken up and is distributed by the blades 33, so that this water sprinkles and irrigates a circle of territory very adjacent the sprinkler. The lower disc 31 strengthens the upper disc 32 and prevents any water from being deflected downwardly by the blades 33 and if any drops of water should tend to remain on this lower disc, they will be thrown therefrom by centrifugal action. In this manner the ground immediately beneath the orbit of the fan will not be over-irrigated so as to become sloppy.

By adjusting the rod 35 by means of the set screw 37 so that its center of gravity is quite remote from the vertical axis of the spindle 28, the speed of rotation of the distributing head can be increased, and conversely if the center of gravity of the rod 35 approaches the vertical axis of the spindle 28, the speed of rotation of the distributing head will decrease and approach zero. Furthermore, if the center of gravity of the rod 35 is in alignment with the axis of the spindle 28, no rotation of the distributing head will be produced. While the fan is being rotated by the water issuing from the nozzle 26 to produce rotation of the distributing head, water is also being discharged through the nozzles 40 and 41. The nozzle 41 is employed to irrigate the ground which is outside the circle of territory irrigated by the water discharged through the nozzle 26, and the upwardly inclined nozzle 40 serves to irrigate the ground most remote from the sprinkler which it is possible to irrigate.

The purpose of the flange or shoulder 21 is as follows: When the water is turned off from the sprinkler, it frequently occurs that there is some grit or sand in the water in the distributing head. This sand tends to fall back down through the stem 14. The shoulder 21 causes it to be deposited centrally of the tubular member 18 which has its upper end slightly coned so that the sand or grit will be caused to fall within the hollow stem 14. It will be readily appreciated that if this flange or shoulder 21 were omitted, the sand or grit could fall down adjacent the soft metal washer 17, so that when the water was again turned on, it would cut this washer, requiring its frequent replacement.

From the above it will be readily appreciated that an improved irrigation sprinkler is provided, in which the means for rotating the rotatable part of the sprinkler consists of a radial nozzle 26 which discharges a stream which will produce the rotation of the eccentric weight adjacent its outer end, and that the re-actions produced by this rotation of the eccentric weight cause a jerky rotational movement which is very slow to be imparted to the rotatable part of the sprinkler.

It will be understood that various changes in the detail of construction may be made without departing from the spirit or scope of the invention as defined by the appended claims.

I claim:

1. A sprinkler comprising a standard, a hollow distributing head rotatably mounted thereon, means providing a nozzle upon the distributing head adapted to discharge the stream radially outwardly from the center of rotation of said head, an arm mounted upon the nozzle and arranged at an angle thereto, a fan rotatably mounted upon said arm about a substantially vertical axis and having blades adapted to be struck by the stream issuing from said nozzle to produce its rotation, means for supplying fluid to the interior of said distributing head, and means operable by rotation of the fan to rotate said distributing head.

2. A sprinkler comprising a standard, a hollow distributing head rotatably mounted thereon, means providing a nozzle upon the distributing head adapted to discharge a stream radially outwardly from the center of rotation of said head, an arm mounted upon the nozzle and arranged at an angle thereto, a fan rotatably mounted upon said arm about an axis which is other than horizontal having blades adapted to be struck by the stream issuing from said nozzle to produce its rotation, and means providing a weight which has its center of gravity eccentric to the axis of rotation of the fan and adapted to be rotated thereby so as to produce rotation of said distributing head and structure carried thereby relatively to the standard.

3. A sprinkler comprising a standard, a hollow distributing head rotatably mounted thereon, means providing a nozzle upon the distributing head adapted to discharge a stream radially outwardly from the center of rotation of said head, an arm mounted upon the nozzle and arranged at an angle thereto, a fan rotatably mounted upon said arm about an axis which is other than horizontal having blades adapted to be struck by the stream issuing from said nozzle to produce its rotation, means providing a weight which has its center of gravity eccentric to the axis of rotation of the fan and adapted to be rotated thereby so as to produce rotation of said distributing head and structure carried thereby relatively to the standard, and means for adjusting the eccentricity of the center of gravity relatively to the axis of rotation of the fan.

4. An irrigation sprinkler comprising a standard, a distributing head rotatably mounted upon the standard, nozzles carried by said distributing head, means for admitting water to the interior of the distributing head so as to be discharged through said nozzles, a weight rotatably mounted upon one of the nozzles for rotation about an axis other than horizontal, said weight having its center of gravity eccentric to its axis of rotation, and means for rotating said weight so as to produce rotation of said distributing head and nozzles.

5. An irrigation sprinkler comprising a standard, a distributing head rotatably mounted upon the standard, nozzles carried by said distributing head, means for admitting water to the interior of the distributing head so as to be discharged through said nozzles, a weight rotatably mounted upon one of the nozzles for rotation about an axis other than horizontal, said weight having its center of gravity eccentric to its axis of rotation, and means for rotating said weight by the stream issuing from one of said nozzles so as to produce rotation of said distributing head and nozzles.

6. An irrigation sprinkler comprising a standard, a distributing head rotatably mounted upon the standard, nozzles carried by said distributing head, means for admitting water to the interior of the distributing head so as to be discharged through said nozzles, a weight rotatably mounted upon one of the nozzles for rotation about an axis other than horizontal, said weight having its center of gravity eccentric to its axis of rotation, means for rotating said weight so as to produce rotation of said distributing head and nozzles, and means for adjusting the eccentricity of the center of gravity of the weight with respect to its axis of rotation.

7. A sprinkler comprising a standard, a hollow distributing head rotatably mounted thereon, means providing a nozzle on the distributing head adapted to discharge a stream radially outwardly from the center of rotation of said head, an arm carried by the head, a fan rotatably mounted upon said arm for rotation about an axis other than horizontal having blades adapted to be struck by the stream issuing from said nozzle to produce its rotation, and means providing a weight which has its center of gravity eccentric to the axis of rotation of the fan and adapted to be rotated thereby so as to produce rotation of the distributing head and structure carried thereby relatively to the standard.

In testimony whereof I have signed my name to this specification.

MARTIN WEBER.